US006481455B2

(12) United States Patent
Gustafson et al.

(10) Patent No.: US 6,481,455 B2
(45) **Date of Patent: *Nov. 19, 2002**

(54) BUBBLE TRAP FOR BLOOD

(75) Inventors: Robert Christian Gustafson, Windham, NH (US); Vernon C. Maine, Nashua, NH (US)

(73) Assignee: Vernon C. Maine PLLC, Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,870

(22) Filed: Mar. 21, 2001

(65) Prior Publication Data

US 2001/0011555 A1 Aug. 9, 2001

Related U.S. Application Data

(63) Continuation-in-part of application No. 09/388,408, filed on Sep. 1, 1999, now Pat. No. 6,209,567.

(60) Provisional application No. 60/098,714, filed on Sep. 1, 1998.

(51) Int. Cl.[7] ................................................ F16K 24/00

(52) U.S. Cl. ........................ 137/173; 137/192; 604/127

(58) Field of Search ................................ 137/173, 192; 604/127

(56) References Cited

U.S. PATENT DOCUMENTS 2,103,057 A * 12/1937 Blumer ....................... 137/173
4,919,802 A 4/1990 Katsura
5,564,459 A 10/1996 Dunne
5,591,251 A 1/1997 Brugger
5,674,199 A 10/1997 Brugger
6,019,824 A 2/2000 Schnell
6,071,269 A 6/2000 Schnell et al.
6,082,389 A 7/2000 Latham et al.
6,117,342 A 9/2000 Schnell et al.
6,209,567 B1 * 4/2001 Gustafson ............... 137/173 X

FOREIGN PATENT DOCUMENTS

GB 1215945 * 12/1970 ................. 137/192
GB 2286581 A 8/1995

OTHER PUBLICATIONS

Metallocraft FOB Detector FB01, Metallocraft & Engineering Ltd, Dublin, Ireland (Undated).
Banner Profit Guard PG–1, Franklin Park, Illinois (Undated).
1999 Foxx Equipment Company Catalog 20D03–429, Foam Preventer 07D08–101.
AJAX USA Draught Beer Equipment Catalog vol. 2, #129700 Empty Beer Keg Shut–Off (Undated).

* cited by examiner

*Primary Examiner*—Gerald A. Michalsky
(74) *Attorney, Agent, or Firm*—Vernon C. Maine; Maine & Asmus

(57) ABSTRACT

A bubble trap for an extracorporeal blood handling or other fluid handling system has a chamber (10) constructed from a top section (20) and bottom section (30). There is a fluid inlet (50), gas vent port (70) for purging gas that has separated from the fluid in the chamber, and a fluid outlet (50). There are two balls (64) and (74), which act as check valves to prevent fluid flowing out the vent port, and gas escaping through the fluid outlet. The chamber geometry prevents entrapment of either ball in the corner as blood level rises or falls. Squeeze bulbs (66) and (76), and shutoff valves (68) and (78), provide for unseating the check balls.

16 Claims, 6 Drawing Sheets

BUBBLE TRAP FOR BLOOD

This application claims priority to pending U.S. application Ser. No. 60/098,714, filed Sep. 1, 1998, through parent application Ser. No. 09/388,408, filed Sep. 1, 1999, now U.S. Pat. No. 6,209,567, of which it is a continuation in part.

BACKGROUND OF THE INVENTION

1. Technical Field of the Invention

This invention relates to devices for preventing the bubbles and froth that collects as gas out of an extracorporeal blood handling system; and more particularly to a gas trap for separating the bubbles from the blood and periodically expelling the gas from the blood handling system when a self actuating ball stopper valve indicates accumulated gas volume is excessive.

2. Background Art

Extracorporeal blood treatment involves removing blood from a patient, treating the blood external to the patient and returning the treated blood to the patient. Occasionally, bubbles form in the blood during extracorporeal blood treatment as a result of leakage of air into the blood at the point blood is withdrawn from the patient for extracorporeal treatment or as a result of leakage of air at points of connection in the extracorporeal treatment system. Bubbles also form as a result of turbulence of the blood flowing in the extracorporeal treatment system and coalescence of gases in the blood during treatment, among other causes. Care must be taken to remove bubbles from the blood prior to returning the blood to the patient and, to the extent possible, prevent formation of bubbles in the blood during treatment. Blood returned to the patient which contains bubbles creates a risk of serious health consequences to the patient.

Most extracorporeal treatment systems incorporate chambers for removal of bubbles from blood treatment. These chambers, often referred to as bubble traps, provide an opportunity for bubbles in the blood to separate from the blood while the blood is in the chamber. Bubbles in the blood rise to the surface of the blood in the chamber. Bubbles in the blood may also separate from the blood as the blood is delivered to the chamber, when the blood is delivered dropwise or in a stream over the surface of the blood already present in the chamber. The gas from the bubbles which collects above the level of blood is mechanically removed from the chamber, or is allowed to remain in the chamber until extracorporeal treatment is complete.

Conditions under which bubbles form in the blood during extracorporeal treatment may be exacerbated by higher blood flow rates. For example, blood entering a bubble trap apparatus at a high rate can froth and create bubbles in the blood present in the bubble trap apparatus. Various geometries have been explored to minimize this contribution to the problem.

When blood is introduced into a bubble trap apparatus below the upper surface of the blood already present in the apparatus, stagnation and clotting have a tendency to occur in the blood near the upper surface of the blood. Stagnation and clotting occur near the upper surface of blood because the newly introduced blood tends to flow downward and often does not mix with blood above the point of introduction and near the upper surface. Some prior art indicates that incoming fluid should be admitted at the top of the chamber so as not to be submerged under fluid already in the chamber. Tangential inlets are known to reduce the turbulence of the inlet stream impacting the fluid in the chamber.

Within the human body, blood is circulated under heart pumping pressures of about 100–200 mm Hg, millimeters of Mercury, or about two to four pounds per square inch. Extracorporeal blood handling systems may exceed these pressures somewhat to achieve the desired flow rates through filters, lines and blood treating components.

Cleanliness is of paramount concern in medical applications involving the recycling of bodily fluids back into the body. Ease of maintenance of the reusable components of blood handling devices is important.

Examples of current art that may provide the reader with useful context for bubble traps are Brugger's U.S. Pat. No. 5,591,251, published Jan. 7, 1997 and Brugger's U.S. Pat. No. 5,674,199, published Oct. 7, 1997; Schnell's U.S. Pat. No. 6,019,824, published Feb. 1, 2000, Schnell et al's U.S. Pat. No. 6,071,269, published Jun. 6, 2000; and Schnell et al's U.S. Pat. No. 6,117,342, published Sep. 12, 2000.

There are similar problems with excessive gas bubbles in pressurized liquids in other arts. Various designs of foam traps are presently in commercial use in the carbonated beverage and beer industry to prevent the entrance of excessive foam into the distribution lines as the keg hits empty, with shutoff valves that hold the liquid in the lines while the empty keg is being replaced or the system is being switched to an already connected next keg. The prior art of Francisco Moreno Barbosa, UK Patent GB2286581, is instructive, as are the examples of commercial products accompanying this application. Most devices use a float to seal the outlet of a reservoir to which the beer lines are attached when the level of liquid in the reservoir falls low. There is an alternate device that operates on a fluid momentum theory; gas versus liquid.

There are many commercial and industrial processes that use gas-propelled liquid pumping or dispensing systems, where it is likewise desirable to prevent or control the amount of foam entering the distribution lines. Liquid dispensing systems using vented containers and mechanical pumps are also subject to the same problem, when the liquid level in a vented tank or container falls to level of the outflow port or suction tube so that air is being sucked into the pump along with the residual liquid. It is to the extracorporeal circulating of blood, as well as other applications in which bubbles and/or foam present in the fluid is a problem, to which the instant invention is addressed.

SUMMARY OF THE INVENTION

It is among the objects of the invention to keep the distribution lines that transport the blood or other liquid in a mechanically pumped or gas propelled liquid dispensing system, full of liquid at all times, and free of propellant gas, air, or foam, by utilizing a novel bubble trap connectable to a liquid container or a manifold to which are connected multiple containers.

It is further among the objects of the invention to employ the trap in an automated control system on a liquid dispensing system pre-connected by a manifold to multiple containers, to sequence the containers when empty without introducing gas or air into the dispensing system.

The foam trap has a reservoir or chamber into which the liquid is piped. The chamber is of suitable interior volume with respect to the viscosity and flow rate of the liquid to act as a coarse gravity separator of the liquid and gas when gas enters the supply line from the container. The chamber has two outlets, an upper gas vent outlet for discharge, and a lower liquid outlet to which the distribution lines are attached. Each outlet is configured with a horizontally oriented valve seat suitable to accept a vertically displaced spherical closing member or floating ball stopper in a sealing relationship. Within the chamber there is a free floating ball stopper for each valve seat, suitable for sealing its respective valve seat when moved and held against it by pressure or gravity. The foam trap also has externally accessible mechanisms for restraining the seating of or for unseating either of the balls independently, when desired. The geometry of the chamber, valves and balls is such that the balls do not compete for either valve seat when both are afloat in rising or falling liquid.

To initiate use, the liquid outlet ball sealing restraint is put in place to insure that the outlet port ball stopper is loose, and the gas vent outlet hall seating restraint is disengaged or removed to allow automatic closure. When liquid enters the chamber from the liquid containers, both ball stoppers are raised with the rising liquid level, and the gas vent ball is floated into place on the vent valve seat, closing the vent port. The ball stopper is held in place by the pressure of the liquid and gas in the system. When maximum pressure is reached, the liquid outlet ball sealing restraint is removed to permit automatic closure, but the liquid outlet ball stopper is still being floated by the liquid in the chamber so the liquid outlet remains open to pass liquid through the lines to the dispensing point until the liquid level drops.

When the container in use is exhausted and "kicks", and the liquid in the trap chamber goes low as it is replaced by propellant gas or air in the system, the liquid outlet is closed and sealed by its ball stopper so that gas or air does not enter the distribution lines. Meanwhile, the gas vent ball stopper remains in place under pressure, maintained by a check valve at the container end of the liquid supply line. Sensing the low pressure in the dispensing line, the operator or the system controller changes or switches to a full container and the supply of liquid is re-established. Thereupon, the gas vent ball stopper is the unseated to open the vent port, and the restraint then removed. This permits the flow of liquid into the chamber to empty the gas and reseat the vent ball. When the vent has closed and the chamber has stabilized at maximum pressure, the liquid outlet ball stopper is unseated and the restraint then removed to resume normal operation.

It is further among the objects of the invention to provide a foam trap that is constructed of materials suitable for contact with blood, rugged and reliable, simple to use, hygienic in that it has minimal internal crevices is easy to disassemble, clean and maintain, and is suitable for regulatory approval. It is yet further among the objects of the invention to utilize principles of symmetry of design and commonality of parts for similar functions to minimize the number of unique parts.

It will be apparent to those skilled in the art, that the invention functions with carbonated or gaseous liquids or fluids, with mixtures of gas and liquid, and with liquids or fluids that are either gas-propelled or mechanically pumped from a container into which replacement air or gas or gaseous fluid flows.

Still other objects and advantages of the present invention will become readily apparent to those skilled in this art from the following detailed description, wherein we have shown and described only a preferred embodiment of the invention, simply by way of illustration of the best mode contemplated by us in carrying out our invention.

DESCRIPTION OF THE PREFERRED EMBODIMENT

The invention is susceptible of many variations. Accordingly, the drawings and following description of the preferred embodiments are to be regarded as illustrative in nature, and not as restrictive.

Figure 1:
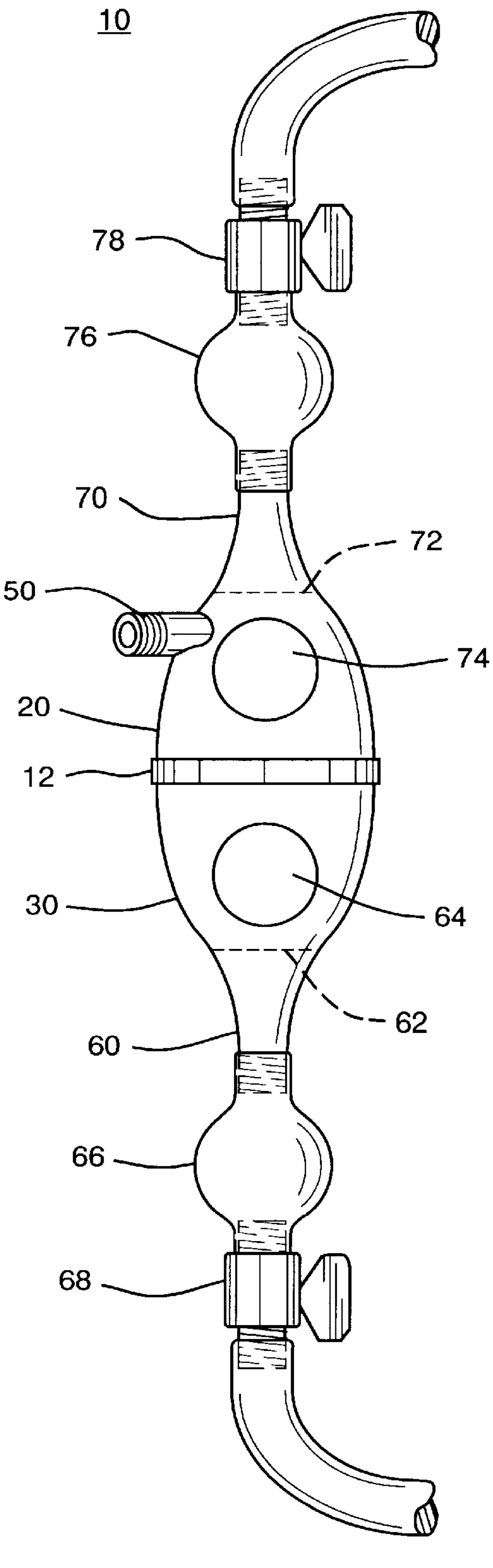
FIG. 1 is a side elevation view of a disposable first embodiment bubble trap for a blood handling system, with upper and lower shut-off valves and squeeze bulbs for unseating respective ball stoppers from ball seats.
Figure 2:
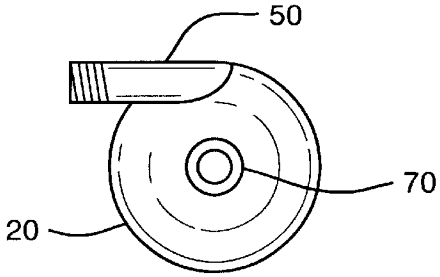
FIG. 2 is a top view of the chamber of FIG. 1, showing the tangential fluid inlet and vent port.
Figure 3:
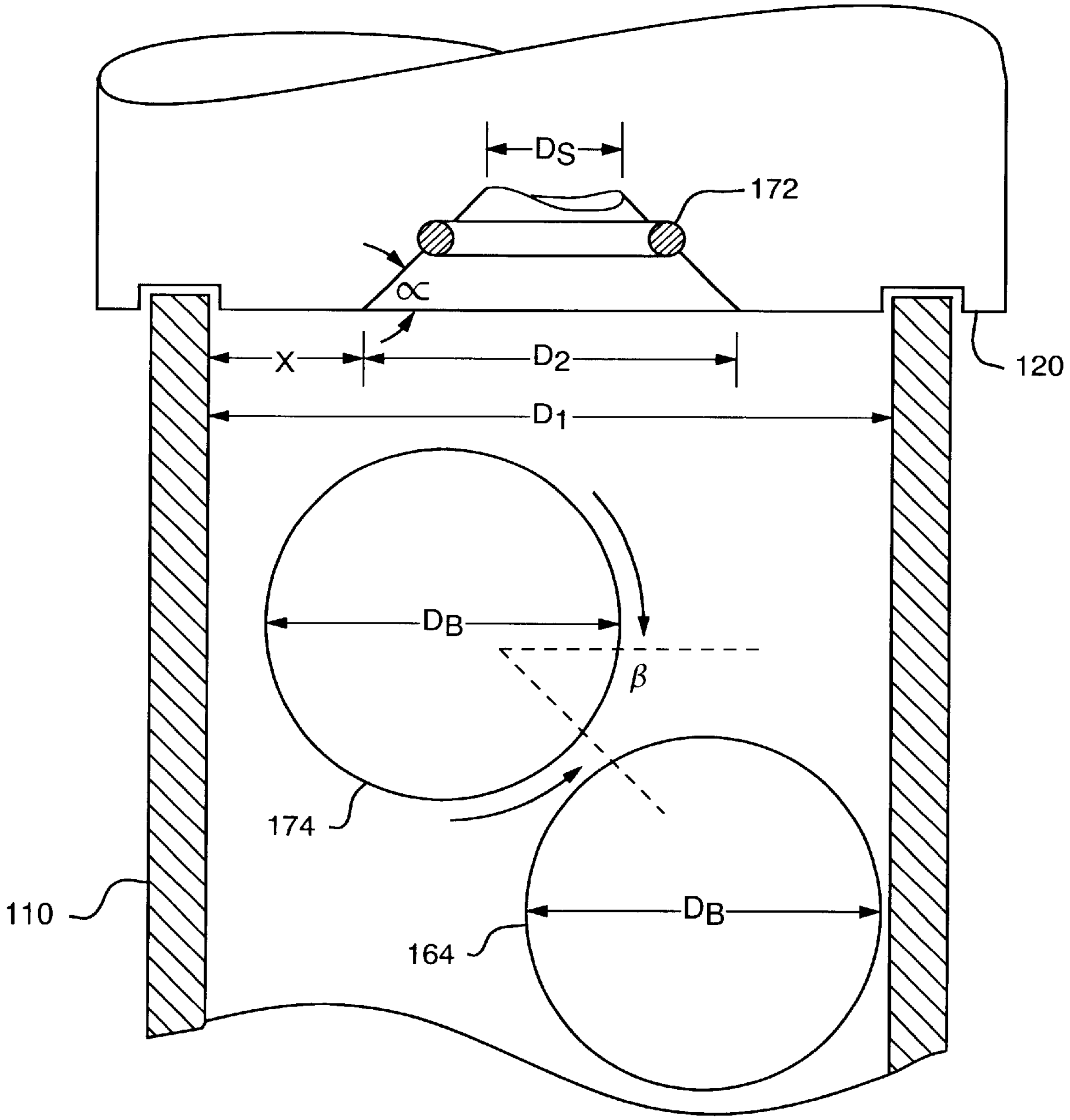
FIG. 3 is a diagrammatic view of the top end of the chamber of the second preferred embodiment, with ball stoppers and upper valve seat, illustrating geometric considerations in size and proportion.
Figure 4:
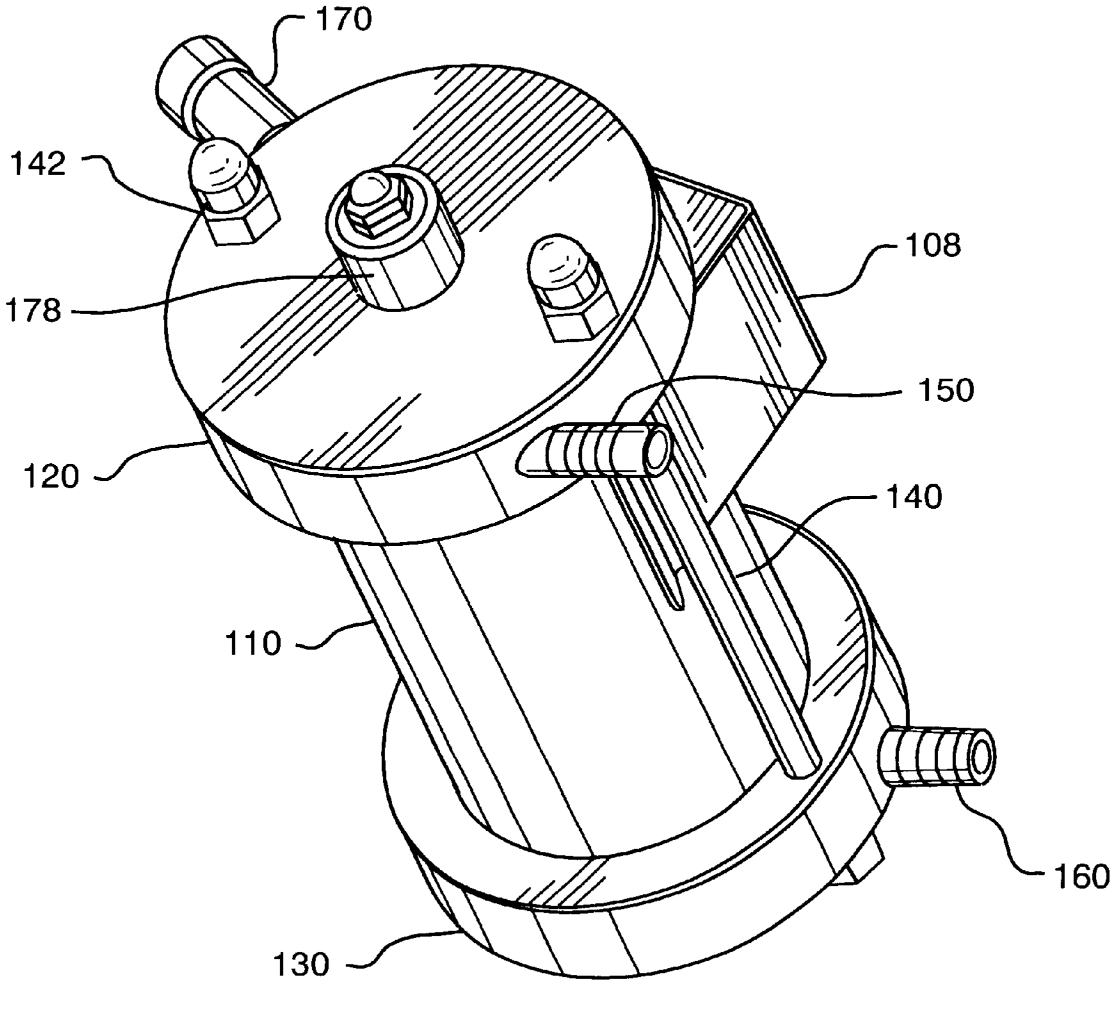
FIG. 4 is a perspective view of the second preferred embodiment bubble trap with transparent tubular casing and stainless steel top and bottom.
Figure 5:
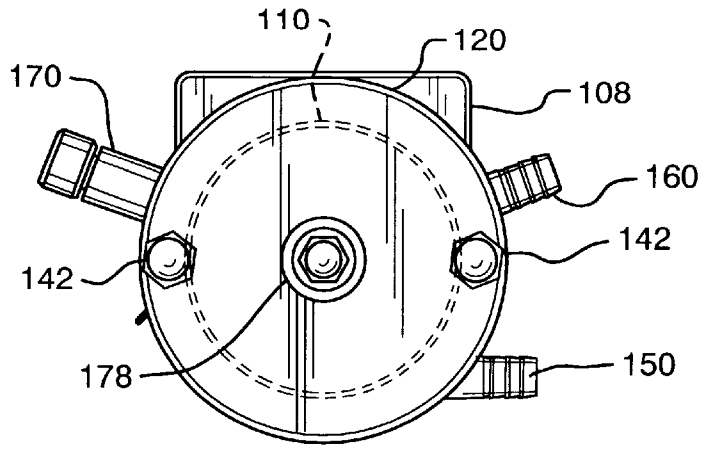
FIG. 5 is a top view of the embodiment of FIG. 4 with dotted line representation of the chamber wall.
Figure 9:
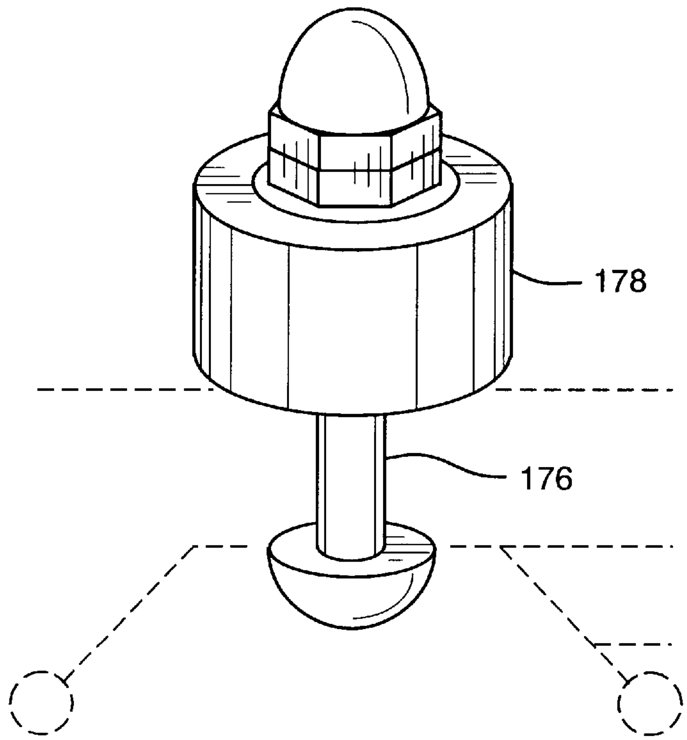
FIG. 9 is an assembled, perspective view of the ball seal break pin and housing assembly of FIG. 8.

Referring to FIGS. 1 and 2, a disposable bubble trap assembly for an extracorporeal blood handling system consists of a transparent plastic chamber 10 constructed from a top section 20 with an open bottom, round shoulders and drawn out taper terminating in a gas vent port 70 for purging gas or air that has separated from the blood in the chamber, and a bottom section 30 with an open top, round shoulders, and drawn out bottom taper terminating in a blood outlet 50 from which the blood is discharged from the chamber; the two sections being joined at a midlevel slip joint 12 by a suitable bonding process. Top section 20 is further configured with a tangential fluid inlet 50, which is connectable by hoses to a pressurized blood source for supplying blood to the chamber.

There are within chamber 10 two check balls, a lower ball 64 and an upper ball 74. These check balls function in conjunction with the tapered ends of sections 20 and 30 as independent check valves that restrict blood from flowing out the vent port, and gas from escaping out the blood outlet. In other art, where check balls and ball seats are used as check valves, ball cages are commonly used to hold the ball stopper in close proximity to the ball seat. To avoid the introduction of further structure and complexity within the chamber which may be difficult to clean, interfere with blood flow patterns and tend to build up deposits or clots, the ball stoppers of the instant invention are free floating in the chamber.

The interior geometry of the chamber is arranged to maintain the respective upper and lower orientation of the respective ball stoppers, and to prevent entrapment of one ball in the corner of the chamber by the other ball as blood level rises or falls. The vent and blood outlet ports and seat lines are centered at their respective ends of the chamber, providing axial outflows, particularly important for the blood flow pattern in the chamber.

Ball 64 and 74 are each of suitable size to seat and seal at seat lines 62 and 72 respectively, in tapered sections 30 and 20. Ball 64 floats sufficiently submerged in the blood as to assure that as it falls with descending blood level in the chamber, it seats and seals before the blood level reaches seat line 62, assuring that no air or gas escapes into the blood outlet and downstream lines. The density of lower ball stopper 64 is preferably about 40 to 50% by weight to the same volume of blood, so that the ball stopper floats about one half submerged and will contact the seat line with a measurable amount of blood remaining above the seat line so as to avoid passing any air or floating residual foam that has not yet fully outgassed into the region above the blood level.

Conversely, ball density and weight of upper ball 74 may be as small and light as practical, so as to provide that at normal system operating pressure, gas pressure alone will hold the ball at seat line 72 so as to seal closed vent port 70, without the direct support of fluid pressure. If the system pressure drops below the minimum required to hold vent 70 sealed, such as with a lose of pump pressure or an open outflow line, the chamber pressure drops to vent pressure; normally atmosphere. This reduces outflow pressure and inflow backpressure until the chamber is refilled and the vent outlet is resealed. For convenience in assembly and assurance in setup checks, the lower ball stopper may be differentiated by a red hue and the upper ball stopper by a blue hue, or by such other visual indicators as may be adopted.

The geometry of the chamber and the check balls is such as to insure that the balls retain their respective upper and lower position relationship and can not be trapped in a corner of the chamber but will always find their respective seat lines when blood levels carry them there.

To provide manual means for unseating the balls from their respective seats so as to purge the chamber of air and to restart blood flow after the chamber is purged, squeeze bulbs 66 and 76 are connected to respective ports 60 and 70. Outboard of the squeeze bulbs there are shutoff valves 68 and 78, beyond which are connected the respective blood lines and vent lines. To unseal vent port 70, for example, shut off valve 78 is closed, and squeeze bulb 76 is squeezed to overcome chamber pressure and unseat ball 74 from setline 72. Valve 78 is then reopened.

The same process is used with respect to the blood outlet to restart blood outflow, using shut off valve 68 and squeeze bulb 66, after the chamber has refilled at least partially with blood so that ball 64 can be floated above its setline 62.

In a more basic embodiment, valves 68 and 78 can be eliminated because the function of valves 68 and 78 can be duplicated by a system operator by mere pinching off of the line adjacent to the respective squeeze bulb so as to provide a small reservoir of air or fluid that can be compressed to exert pressure against the respective check ball to overcome chamber pressure and dislodge the ball from its seat. Other mechanisms, both manual and automatic, for dislodging and for restraining the balls from subsequent reseating, are within the scope of the invention.

Inlet 50 being at the top of the chamber and opening tangential to the vertical tube wall of the chamber, the inlet stream is admitted above the blood already in the chamber and is decelerated and directed smoothly by the tube wall into a circular down flow pattern that gradually reaches the bottom and then inward to the axial outlet. This provides the maximum opportunity for normal gravitational release of bubbles from the fluid flow. The loose lower ball 64 floats as high in the chamber as fluid level and the chamber geometry permits, and yields readily to flow pressure so as to find its way to a location of equilibrium within the flow pattern.

The chamber dimensions can be tailored in height and diameter to minimize interior volume while maintaining the operating characteristics of the ball stoppers.

During normal operation of the preferred embodiment, inlet 50 is connected to a pressurized blood source, the gas vent 70 is sealed by ball 74 at seat line 72, the chamber is full of blood, outlet 60 is open and ball 64 is floating at the top of the chamber. Blood is entering tangentially at the top of the chamber and flowing in a circular fashion around chamber 10 and lower ball 64 and down through the bubble trap and inwards to the axial outlet 60 when the outlet lines are open to the receiving component of the blood handling system. Bubbles gravitate to the top of chamber 10 without impeding the flow of blood through the trap until air or gas has accumulated to the extent that the fluid level in the chamber is too low to support the lower ball 64 above lower seat line 62. Operation of the bubble trap action to purge of the accumulated gas is as follows:

1. As gas is released from the circulating blood and accumulates in the chamber, the floating lower ball stopper falls with the falling level of blood in the chamber.
2. The level of blood in the chamber gets sufficiently low that the floating ball stopper is pushed into the blood outlet valve seat by the gas pressure. The upper ball in the gas vent seat is still held in place by the gas pressure inside the bubble trap.
3. At this point the blood has stopped flowing in the outlet distribution line because the lower ball stopper has blocked the flow. The distribution line remains full of blood.
4. Upon sensing the stoppage, either the operator manually or the system automatically unseats the vent valve ball stopper to be free floating in the chamber, and returns the vent line to an open condition. The gas escapes out the vent. As the gas escapes, the inflow of blood begins to fill the chamber again.
5. Once the blood level approaches the top of the chamber, the vent is sealed by the floating gas vent ball stopper.
6. Then, or after a brief further waiting period for initial separation of gas from the freshly filled chamber, the system or the operator unseats the blood outlet lower ball stopper to be free floating in the chamber, and returns the blood outflow line to an open condition. Blood flows again in the distribution lines.

The above description assumes the system is intended to circulate blood at a pressure somewhat above atmosphere. If the outflow of the blood from the chamber is to be gravity operated at atmospheric pressure, the blood outflow can be initiated before the chamber is full and the vent line resealed by upper ball 74. The vent line will then only seal if the inflow exceeds outflow and the chamber fills up.

The foam purge step takes only as long as the discharge and refilling of the chamber. The tangential inlet permits the refill to occur with minimum turbulence so that upon being refilled, gas bubbles in the blood at the bottom of the chamber have risen sufficiently for restarting blood flow. The chamber volume is reduced by the combined ball stopper volumes, so the volume of blood utilized by the trap when full is less than at first apparent.

Referring now to FIGS. 3–9, if higher pressures are required, or if a non-disposable form of the invention is preferred, a second embodiment, employing the same basic principles but being more robust, may be more useful. What is shown is another bubble trap for an extracorporeal blood handling system, consisting of a transparent cylinder section 110, stainless steel top 120 and bottom 130, clamped together with external bolts 140 and cap nuts 142 to form a chamber or reservoir. Top 120 has a tangential blood inlet 150 for connecting to a blood source, and gas vent 170 for purging gas from the bubble trap. Bottom 130 has blood outlet 160 for admitting blood into the lines connecting to the blood handling system. Bracket 108 is used to secure the bubble trap to a cabinet sidewall or other support structure.

Outlets 160 and 170 are terminated in the bubble trap by respective valve seats 162 and 172, both of the same size and both coaxially located within their respective caps 120 and 130. Ball stoppers 164 and 174 are each of suitable size to seat and seal in valve seats 162 and 172. The density of lower ball stopper 164 is preferably about 40 to 50% by weight for the same reason as in the prior embodiment. Again, upper ball stopper 174 may be as small and light as practical, so as to insure that at normal system operating pressure, gas pressure alone will hold the ball in the vent gas seat without the support of fluid pressure.

Figure 7:
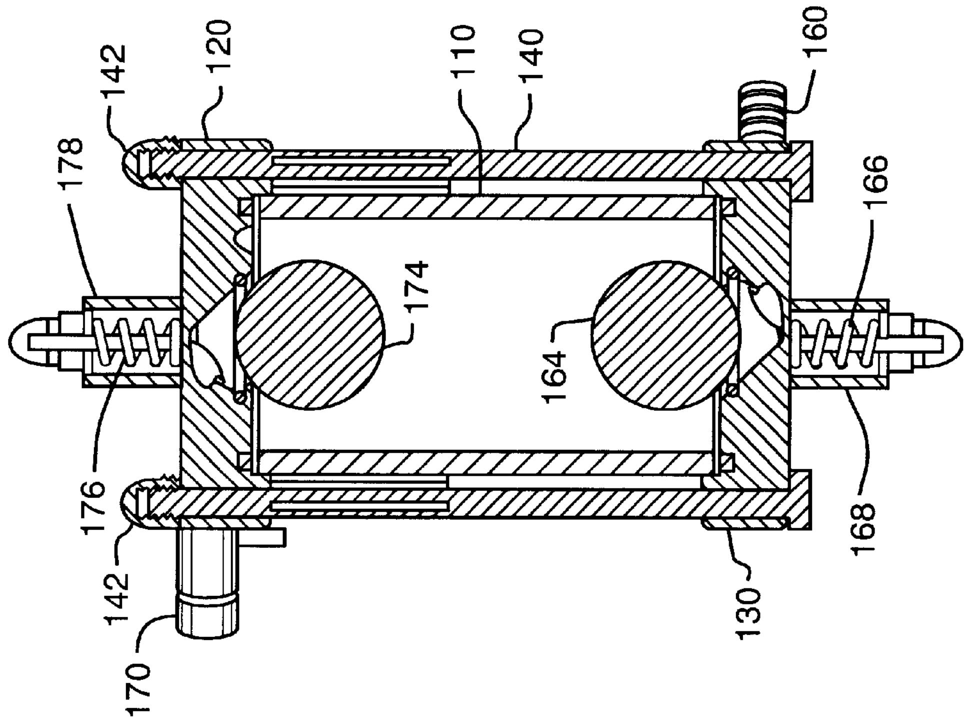
FIG. 7 is a front elevation section view of the FIG. 4 embodiment, showing the two ball stoppers in proximity to the upper and lower ball seats and ports.
Figure 6:
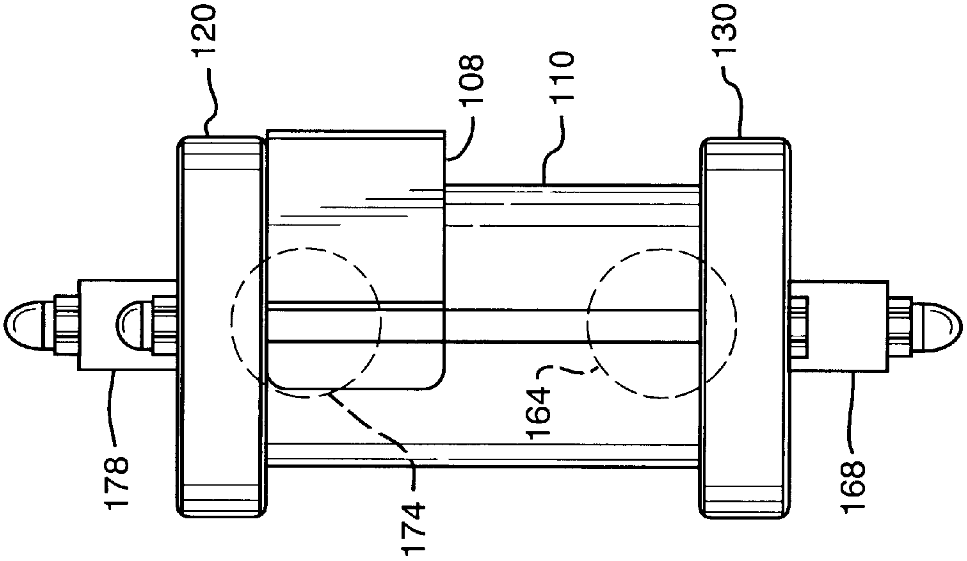
FIG. 6 is a side elevation of the embodiment of FIG. 4, with dotted line representation of ball stoppers.
Figure 8:
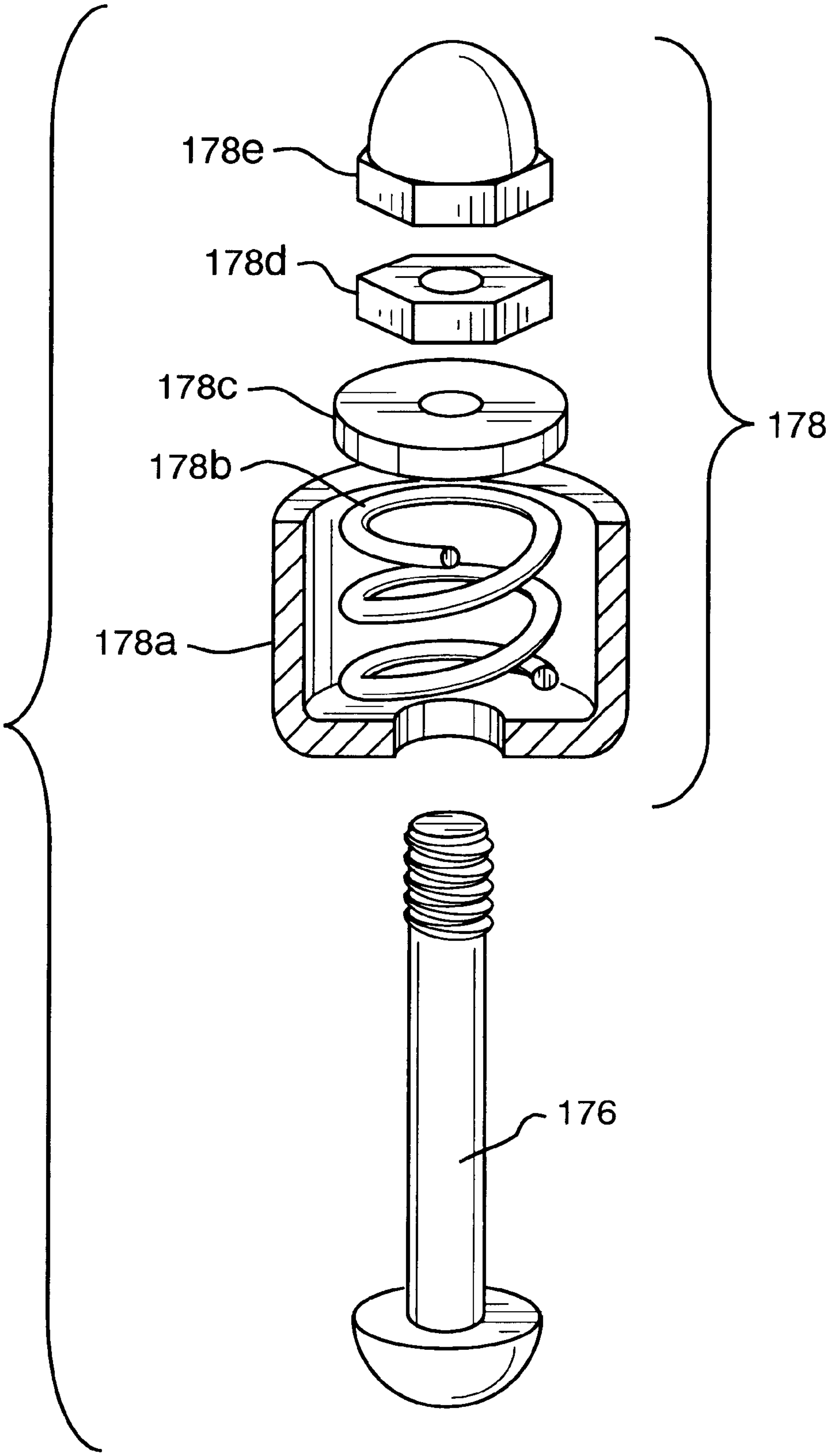
FIG. 8 is an exploded view of a ball seal break pin and housing assembly of the embodiment of FIG. 4, which can be depressed to push a ball stopper away from its ball seat.

Referring to FIGS. 6 and 7, pin housing 178 consists of cup seal 178A, return spring 178B, seal washer 178C, lock nut 178D, and cap nut 178E, and accepts the threaded end of pin 176 to form a normally retracted pin assembly that is coaxially mounted on cap 120 so as to place the head of pin 176 at the apex of the vent seat taper. Pin housing 168 and pin 166 are identically assembled and similarly mounted on cap 130. Coaxially configured ball seal break pins 166 and 176 are spring loaded within pin housings 168 and 178 to remain retracted out of their respective outflow channels, but the cap nut ends protrude externally from their housings so that they can be pushed inward manually or by controlled means such as an electric relay or mechanical actuator.

When a ball stopper is seated in its respective ball seat, depressing the associated ball seal break pin brings the pin head into contact with the ball stopper and pushes it away from the ball seat so as to break the seal and either drop or float the respective ball stopper to the present fluid level in the chamber. When the cap nut end is released, the ball seal break pin is returned by spring pressure to the retracted position. This mechanical check ball release design produces the same result as the external butterfly valve and squeeze bulb of the first embodiment. In fact, the check ball release mechanism of the first embodiment can be employed with this chamber design if desired.

Either or both ball seal break pins 166 and 176 and respective housings 168 and 178 can be configured for simple twist lock action so as to permit pin 166 and/or 176 to be depressed and rotated slightly so as to be held in the extended position, assuring that respective ball stoppers 164 and 174 are unable to reseat and close their respective outlets until desired. Other externally accessible mechanisms for dislodging the check balls, and for restraining the check balls from reseating and resealing their respective outlets are within the scope of the invention.

The geometry of the chamber, ball stoppers and valve seats of this embodiment is substantially the same for outlet 160 and gas vent 170, arid is particularized to provide for commonality of parts, including same size ball stoppers and valve seats. The interior geometry of the chamber is again arranged to maintain the respective upper and lower orientation of the ball stoppers, and to prevent entrapment of one ball stopper in the corner of the chamber by the other ball stopper as fluid level rises or falls. The valve seats are again centered at their respective ends of the chamber.

Inlet 150 is at the top of the chamber, slightly inclined through cap 120, and opens tangential to the vertical tube wall of the chamber. As in the previous embodiment, the inlet stream is admitted above the fluid already in the chamber and is decelerated and directed smoothly by the tube wall into a circular down flow pattern that gradually reaches the bottom and then inward to the axial outlet.

The chamber dimensions can be tailored in height and diameter to minimize interior volume while maintaining the operating characteristics of the ball stoppers. Referring again to FIG. 3 in particular, to support the gas vent ball stopper:

$P_{min}\pi D_S^2/4$>weight of ball, $P_{min}$=minimum pressure $D_S$=diameter of valve seat weight of ball stopper=$\delta\pi D_B^3/6$ $\delta$=density $D_B$=diameter of ball stoppers For valve seat sealing at 45° tangent against the ball stopper;

$$D_S=\sqrt{2}D_B/2$$

For the ball to find the sealing surface of the valve seat;

$$(D_1-D_2)/2=X,\ X<D_B/2$$

$D_1$=interior diameter of cylinder

So that both ball stoppers don't get wedged when floating;

$$\beta=\cos^{-1}((D_1+D_B)/D_B),\ D_1<2D_B,$$

and $$D_1=D_B(1+\cos\beta)$$

$\beta$=angle off horizontal between ball stoppers in contact

The flow area A for blood around the floating ball is;

$$A=\pi((D_1^2-D_B^2)/4$$

As stated above, this embodiment operates in the same manner as the first embodiment, with the exception of the mechanism for unseating the ball stoppers, which was explained above.

As will be readily apparent to those skilled in the art, the duration of operation between purging actions depends on the flow rate and the amount of aeration or gas in the blood supply. The action of the bubble trap in automatically closing off outflow when the fluid level drops is a self actuating valve closure that permits easy changeover of blood sources when required, and the opportunity to make other adjustments in the upstream lines that may introduce air into the system.

An automated blood handling system may incorporate a sensor to indicate when the outlet valve has closed, implying the chamber is empty of fluid, thereupon automatically initiating the purging action by forcing the vent gas ball stopper away from its valve seat as by use of a relay to actuate the illustrated lever and cam. Alternatively, sensors may provide visual or audio cue to an operator for manual purging.

Algorithms consistent with the principles disclosed above can be incorporated into a computer control system, and used to operate the blood trap in conjunction with other functions of the corporeal blood handling system.

The description and drawings of the preferred embodiment clearly illustrate the principles of the invention. As will be realized, the invention is capable of other and different embodiments, and its several details are capable of modifications in various obvious respects, all without departing from the essence of the invention.

For example, there is within the scope of the invention a bubble trap consisting of a vertically oriented cylinder configured with a detachable top plate and a detachable bottom plate. The top plate may incorporate the upper ball stopper valve seat and gas vent port, and the bottom plate incorporate the lower ball stopper valve seat and liquid outlet port. The upper ball stopper valve seat and lower ball stopper valve seat may be the same size, and the two floating ball stoppers may be the same size. The interior geometry of the container may be configured to prevent cross-interference of seating of the ball stoppers in the valve seats, so that the ball stoppers are not competing for or blocking each other from being floated into position. All or substantial components of the bubble trap may be made of stainless steel or other components that meet hygienic and regulatory requirements or are otherwise desirable for the application. The cylinder portion may be transparent or have a transparent window so that the level of fluid is easily visually discernible for verification by the operator.

The means for dislodging and constraining the ball stoppers from reseating in a valve seat may include the use of a rotable cam positioned adjacent to each valve seat so that the cam surface may be rotated into or out of the zone of the valve seat so as to interfere with the normal seated position of the ball stopper. If the ball stopper is present, it is dislodged and the respective port is opened to outflow. The ball stopper is constrained from reseating on the valve seat under all circumstances until the cam is rotated to a non-interfering position. The cams are each connected by cam shafts extending through the plates to respective, independent external means for rotating the cams. The means for rotating may be or include both a manually operable lever that may be moved so as to rotate the cam between interfering and non-interfering positions, or a remotely operable indexed and powered rotary mechanism that may either be switched between interfering and non-interfering positions or advanced rotationally in one direction between positions.

As another example, there is a bubble trap for separating gas from a fluid in a pressurized fluid handling system, consisting of a vertically oriented circular chamber with a coaxial vent port and vent port ball seat at the top end, a fluid inlet near the top end, and a coaxial fluid outlet and fluid outlet ball seat at the bottom end. The inlet port is connectible to a source of the fluid under pressure, and the fluid outlet is connectible to a fluid receiver, including a live patient in the case of blood or bodily fluid, or another component of the fluid handling system.

There is an upper check ball and a lower check ball, each lighter in density than the fluid so as to float readily in the fluid, both being confined within the chamber. The vent port and the fluid outlet are independently closable to outflow of fluid from within the chamber by having respective check balls being seated in their respective ball seats when the fluid level transports a check ball to the correct level. There are also separate and externally accessible mechanisms for dislodging the upper check ball from the vent port ball seat, and the lower check ball from the fluid outlet ball seat. The fluid may be blood. The fluid inlet may be tangentially aligned to the chamber so that incoming fluid is diverted into a circular flow by the chamber wall.

The chamber may be constructed of a transparent tube section closed off at the upper end with a top configured with the fluid inlet, the coaxial vent port, and an externally accessible mechanism for dislodging the upper check ball from its seat. The tube section may be closed off at the lower end with a bottom configured with the fluid outlet and an externally accessible mechanism for dislodging the lower check ball from its seat.

The mechanisms for dislodging the check balls may be respective upper and lower normally retracted, ball seat break pins. Each of the two pins may be coaxially mounted in a respective spring loaded housing that is mounted external of the chamber so as to place the head of each pin at the apex of a respective ball seat where it does not interfere with normal outflow when retracted, but permits inward extension of the pin into contact with the check ball when the check ball is seated in the ball seat, so as to dislodge the ball and set it afloat in the chamber, thus opening the vent or fluid outlet, as the case may be.

The geometry of the check balls, chamber, and ball seats is such as to prevent the interchanging of the upper and lower check balls and the entrapment of a check ball within a corner of the chamber. The lower ball stopper may be of greater density than the upper ball stopper.

The chamber may consist of a circular top section and mating bottom section, where the top section is configured with a lower open end and a fluid inlet and terminating at its top end with a vent port, and the bottom section is configured with an upper open end and terminating at its lower end with a fluid outlet. The top section and the bottom section would be joined or be joinable at their open ends so as to form the chamber.

There may be externally accessible means for dislodging a said check ball from its seat consisting of a squeeze bulb and collapsible line attached to a respective end of the chamber, where the line can be pinched off and the bulb squeezed to apply release pressure on the check ball. There may be a shut-off valve outboard of the squeeze bulb, so that the line need not be pinched off in order to close off the volume of the squeeze bulb.

Other numerous and useful embodiments within the scope of the claims that follow will be readily apparent from the description and figures provided.

We claim:

1. A bubble trap for separating gas from a fluid in a pressurized fluid handling system comprising:

a vertically oriented circular chamber with a coaxial vent port and vent port ball seat at the top end, a fluid inlet near said top end, and a coaxial fluid outlet and fluid outlet ball seat at the bottom end, said inlet port connectible to a source of said fluid under pressure, said fluid outlet connectible to a fluid receiver, an upper check ball and a lower check ball, each lighter in density than said fluid so as to float, both confined within said chamber, said vent port and said fluid outlet being independently closable to outflow from within said chamber by respective said check balls being seated in respective said ball seats when fluid levels transport respective said balls thereto, externally accessible means for dislodging said upper check ball from said vent port ball seat, and externally accessible means for dislodging said lower check ball from said fluid outlet ball seat.

2. A bubble trap according to claim 1, said fluid being blood.

3. A bubble trap according to claim 1, said fluid inlet being tangentially aligned to said chamber.

4. A bubble trap according to claim 1, said chamber constructed of a transparent tubular section closed off at the upper end with a top configured with said fluid inlet, said vent port, and said externally accessible means for dislodging said upper check ball, and closed off at the lower end with a bottom configured with said fluid outlet and said externally accessible means for dislodging said lower check ball.

5. A bubble trap according to claim 4, said means for dislodging said check balls comprising respective upper and lower normally retracted ball seat break pins, each said pin coaxially mounted in a respective spring loaded housing external of said chamber so as to place the head of each said pin at the apex of a respective said ball seat and permit inward extension of said pin into contact with a respective said check ball when said check ball is seated in its respective said ball seat.

6. A bubble trap according to claim 5, the geometry of said check balls, said chamber and said ball seats preventing the interchanging of upper and lower check ball positions and the entrapment of a check ball within a corner of said chamber.

7. A bubble trap according to claim 1, said lower ball stopper being of greater density than said upper ball stopper.

8. A bubble trap according to claim 1, said chamber comprising a circular top section configured with a lower open end and a said fluid inlet and terminating at its top end with said vent port, and a bottom section configured with an upper open end and terminating at its lower end with said fluid outlet, said top section and said bottom section being joined at said open ends.

9. A bubble trap according to claim 8, each said externally accessible means for dislodging a said check ball comprising a squeeze bulb and collapsible line attached to a respective said end of said chamber.

10. A bubble trap according to claim 9, further comprising a shut-off valve outboard of each said squeeze bulb.

11. A bubble trap for separating gas from blood in an extracorporeal blood handling system comprising:

a vertically oriented circular chamber with a coaxial vent port and vent port ball seat at the top end, a blood inlet near said top end, and a coaxial fluid outlet and fluid outlet ball seat at the bottom end, said inlet port connectible to a source of said blood under pressure, said blood outlet connectible to a blood receiver, an upper check ball and a lower check ball, each lighter in density than said blood so as to float therein, both confined within said chamber, said vent port and said blood outlet being independently closable to outflow from within said chamber by respective said check balls being seated in respective said ball seats when blood levels transport respective said balls thereto, said chamber constructed of a transparent tubular section closed off at the upper end with a top configured with said fluid inlet, said vent port, and an externally accessible means for dislodging said upper check ball, and closed off at the lower end with a bottom configured with said fluid outlet and an externally accessible means for dislodging said lower check ball, the geometry of said check balls, said chamber and said ball seats preventing the interchanging of upper and lower check ball positions and the entrapment of a check ball within a corner of said chamber.

12. A bubble trap according to claim 11, said fluid inlet being tangentially aligned to said chamber.

13. A bubble trap according to claim 11, said means for dislodging said check balls comprising respective upper and lower normally retracted ball seat break pins, each said pin coaxially mounted in a respective spring loaded housing external of said chamber so as to place the head of each said pin at the apex of a respective said ball seat and permit inward extension of said pin into contact with a respective said check ball when said check ball is seated in its respective said ball seat.

14. A bubble trap for separating gas from blood in a corporeal blood handling system comprising:

a vertically oriented circular chamber with a coaxial vent port and vent port ball seat at the top end, a blood inlet near said top end, and a coaxial blood outlet and blood outlet ball seat at the bottom end, said inlet port connectible to a source of said blood under pressure, said blood outlet connectible to a blood receiver, an upper check ball and a lower check ball, each lighter in density than said blood so as to float therein, both said balls confined within said chamber, said vent port and said blood outlet being independently closable to outflow from within said chamber by respective said check balls being seated in respective said ball seats when fluid levels transport respective said balls thereto, externally accessible means for dislodging said upper check ball from said vent port ball seat, and externally accessible means for dislodging said lower check ball from said blood outlet ball seat, the geometry of said check balls, said chamber and said ball seats preventing the interchanging of upper and lower check ball positions and the entrapment of a check ball within a corner of said chamber, said chamber comprising a circular top section configured with a lower open end and a said fluid inlet and terminating at its top end with said vent port, and a bottom section configured with an upper open end and terminating at its lower end with said fluid outlet, said top section and said bottom section being joined at said open ends.

15. A bubble trap according to claim 14, each said externally accessible means for dislodging a said check ball comprising a squeeze bulb and collapsible line attached to a respective said end of said chamber.

16. A bubble trap according to claim 15, further comprising a shut-off valve outboard of each said squeeze bulb.

* * * * *